Sept. 7, 1943.     E. SCHOETTEL     2,329,002
SAFETY VALVE
Filed April 26, 1941
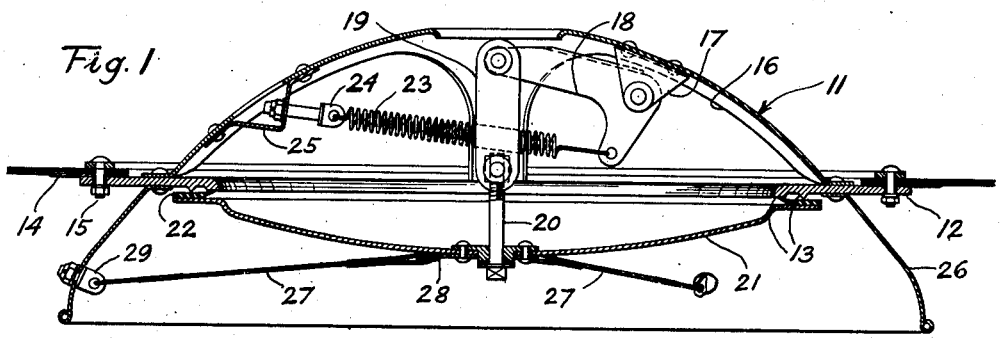
Fig. 1
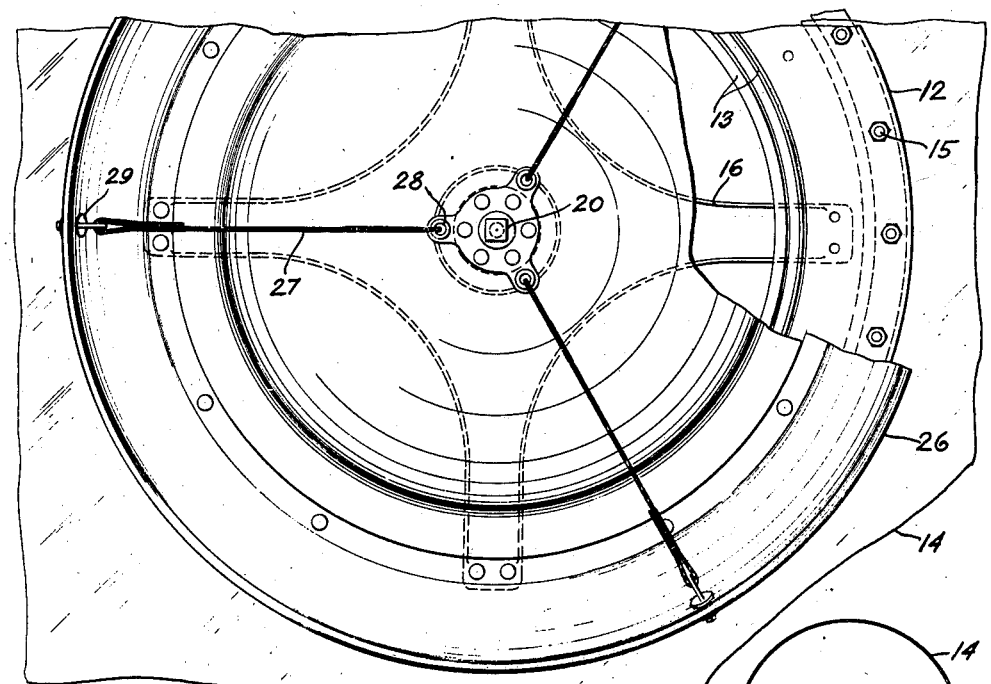
Fig. 2
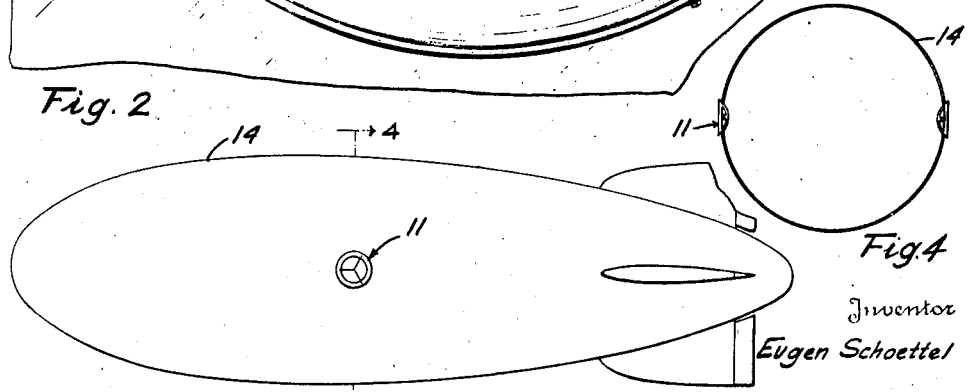
Fig. 3
Fig. 4
Inventor
Eugen Schoettel
By
Attorney Patented Sept. 7, 1943

2,329,002

UNITED STATES PATENT OFFICE 2,329,002

SAFETY VALVE

Eugen Schoettel, Akron, Ohio

Application April 26, 1941, Serial No. 390,629

5 Claims. (Cl. 244—99)

This invention relates to the construction of a gas valve and in particular to a safety valve that is used in lifting gas containers of aircraft lighter-than-air, so-called aerostats.

The object of this invention is to improve the functioning of such a valve when super-pressure has built up in the gas container and to obtain a sufficient valve opening for relieving the pressure as quickly as expedient.

Another object of this invention is to insure that the valve will remain open long enough to permit discharge of sufficient gas to bring the pressure within the aerostat to the desired amount.

Another object of this invention is to provide a valve of this character having certain novel features whereby the valve will be more efficiently and readily controlled and will open and close with a minimum of effort.

It was found that safety valves formerly installed in the envelope of a gas container did not open the full amount for which they were constructed and, therefore, had to be of larger size to permit passing of the required volume of gas without increase of the gas pressure within the container. The reason for that condition was that as soon as the valve opened the gas escaped radially and the pressure against the valve disk suddenly dropped and then was insufficient to fully open the valve against the spring tension, unless the pressure inside the container rose to an amount inadmissible.

According to this invention that deficiency is removed by providing the valve body on its outside with a deflector, preferably annular, to change the direction of the gas flow, originally radially, in the direction in which the valve opens, or nearly so. With this arrangement the valve is pushed fully open and stays open until the super-pressure in the gas container has actually disappeared. The reason for that is that the gas with altered direction of flow has the tendency to push the valve outwardly. This tendency at the same time is enhanced by the suction created on the outside of the valve disk by the outrushing gas, thus compensating for the decrease in pressure on the inside.

For a better understanding of this invention it shall now be described in detail by reference to the accompanying drawing in which:

Fig. 1 is an elevational cross-section of the valve, according to the invention;

Fig. 2 is a plan view thereof;

Fig. 3 is a diagrammatic side view of an airship showing the valve mounted thereon;

Fig. 4 is a cross-section taken along the line 4—4 in Fig. 3.

In the drawing the valve 11 consists of a valve body including an annular frame 12 which also provides the valve seat 13. The frame 12 is fastened to the outside of a gas bag or container 14 by bolts 15. On the inside of the valve frame is fastened the four-armed spider 16 which carries the valve mechanism including a fulcrum 17 about which the bell crank 18 turns and which in turn is connected by a link 19 and an adjusting screw 20 to the center of the valve disk 21. The rim of this disk is provided with a rubber gasket 22 which is pressed against the valve seat by means of a spring 23, attached to the short arm of the bell crank and fastened to an adjustable eyebolt 24 anchored by a bracket 25 to the spider 16. The spring is tensioned for a predetermined gas pressure above which the valve automatically opens. A deflector ring 26 is riveted to the outside of the valve frame to force the valved gas in a direction substantially that in which the valve opens, whereby the valve remains open as long as a super-pressure prevails in the gas container. For centering the valve disk on its seat three radial cables 27 equally spaced and attached to the eyelets 28 at the center of the valve disk and to eyebolts 29 fastened to the deflector, are provided.

It is to be understood that I do not wish to be limited to the embodiment as illustrated and described, but that many modifications may be made without departing from the spirit of the invention and from the scope as defined by the appended claims.

Having thus fully described my invention, what I claim and desire to secure by letters patent of the United States is:

1. An automatic safety valve for aerostats comprising a valve body and a valve disk seated thereon, a dome-shaped spider frame extending inwardly of said valve body, an adjustable tension spring-operated valve mechanism mounted within the space of said frame, a central valve stem adjustably connecting said valve disk with said mechanism, a deflector surrounding said valve disk to force the gas to be valved in substantially the same direction in which the valve opens, and radial flexible connections extending between the deflector and the valve disk and outside the valve to center the valve disk on its seat.

2. An automatic safety valve for aerostats comprising a valve body and a valve disk seated thereon, a dome-shaped spider frame extending inwardly of said valve body, a valve mechanism mounted within the space of said frame and consisting of a spring-controlled bell crank pivoted to the frame and of a swingable link attached adjustably to said valve disk and to the bell crank, a deflector surrounding said valve disk to force the gas to be valved in substantially the same direction in which the valve opens, and radial flexible connections outside the valve to center the valve disk on its seat.

3. A safety valve for aerostats comprising a valve body and a valve disk seated thereon, a dome-shaped spider frame connected to and extending inwardly of the valve body, a valve-actuating mechanism mounted within the space of the frame and including a bell crank pivotally secured to the frame, a spring adjustably secured to the frame by one end and to one end of the bell crank by the other, a link pivotally secured at one end to the valve disk and at its other end pivotally secured to the other end of the bell crank, and radial flexible connections outside the valve to center the valve disk on its seat.

4. A safety valve for aerostats comprising a valve body and a valve disk seated thereon, a dome-shaped spider frame extending inwardly of the valve body, a valve-actuating mechanism mounted within the space of the frame and including a bell crank pivotally secured to the frame, a spring adjustably secured to the frame by one end and at its other end to one end of the bell crank, and a link pivotally secured at one end to the valve disk and at its other end pivotally secured to the other end of the bell crank.

5. An automatic safety valve for aerostats comprising a valve seat, a valve disk, valve-actuating means on the gas side of the seat, an outwardly flaring deflector ring on the air side of the seat, and a plurality of circumferentially-spaced, radially-extending, flexible connections between the deflector ring and the valve disk.

EUGEN SCHOETTEL.